Sept. 27, 1938.  V. M. GREEN ET AL  2,131,029
MOTIONAL ADVERTISING DISPLAY DEVICE
Filed June 7, 1938   4 Sheets-Sheet 1
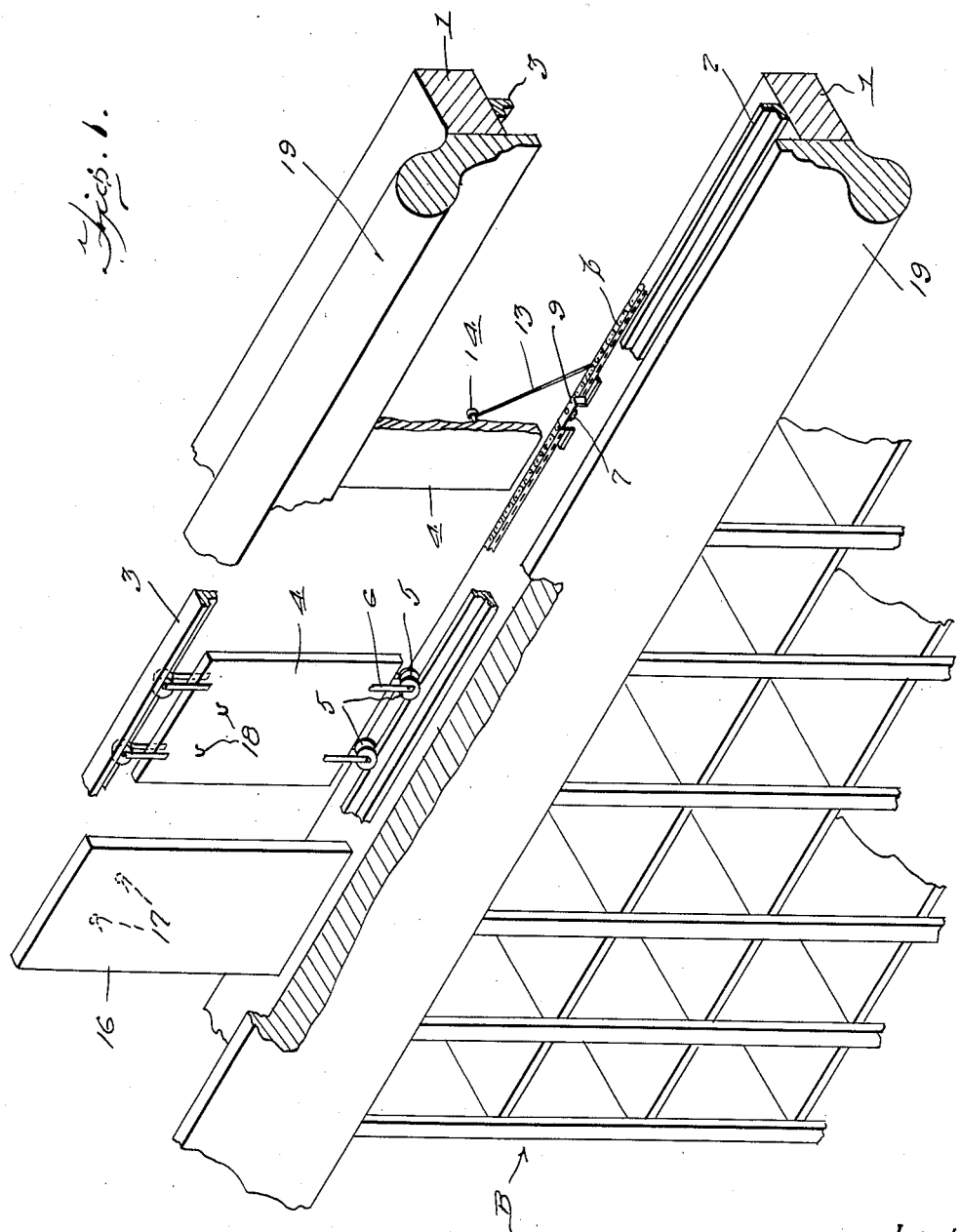
Inventors
V. M. Green
C. E. Gurtler
By Clarence A. O'Brien
and Hyman Berman
Attorneys

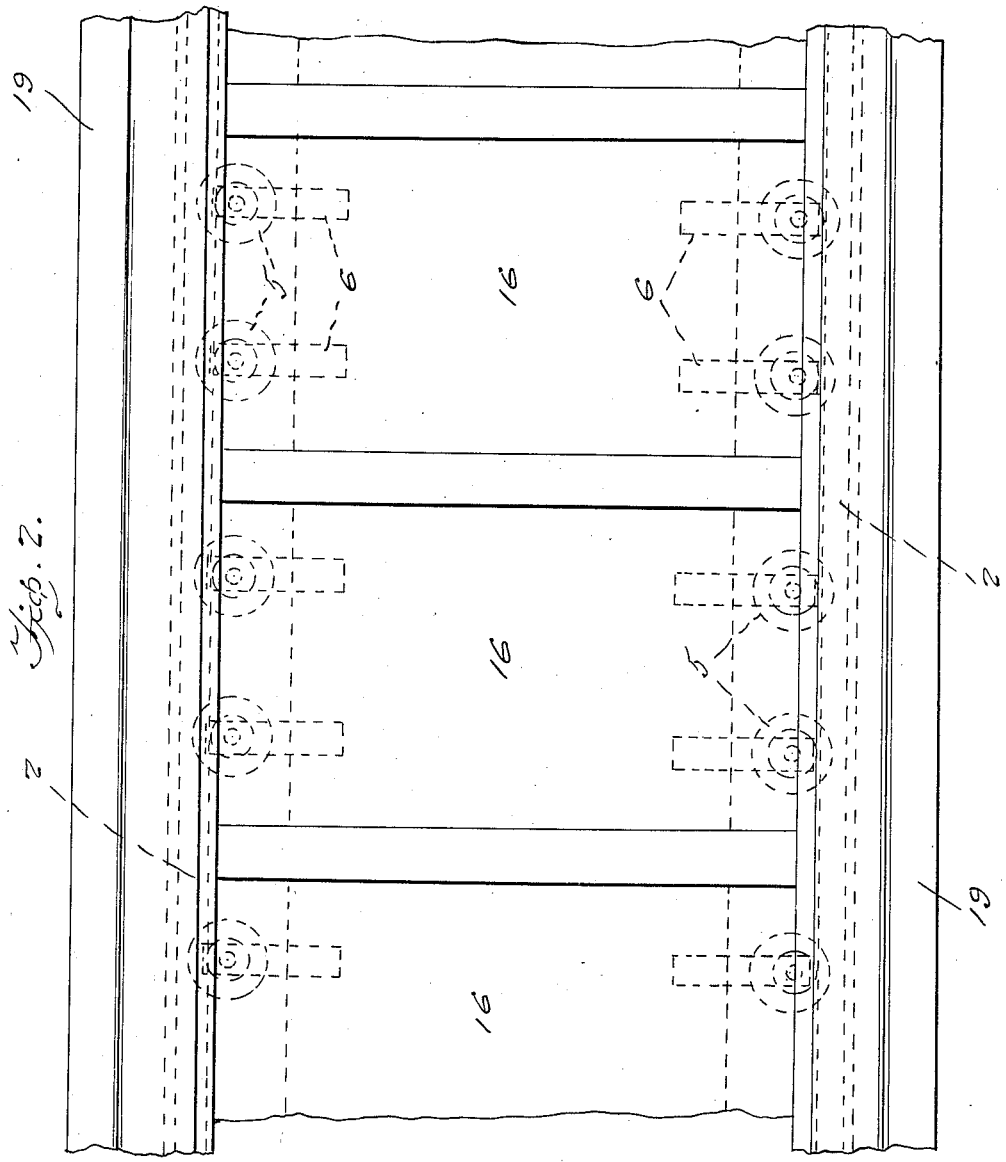

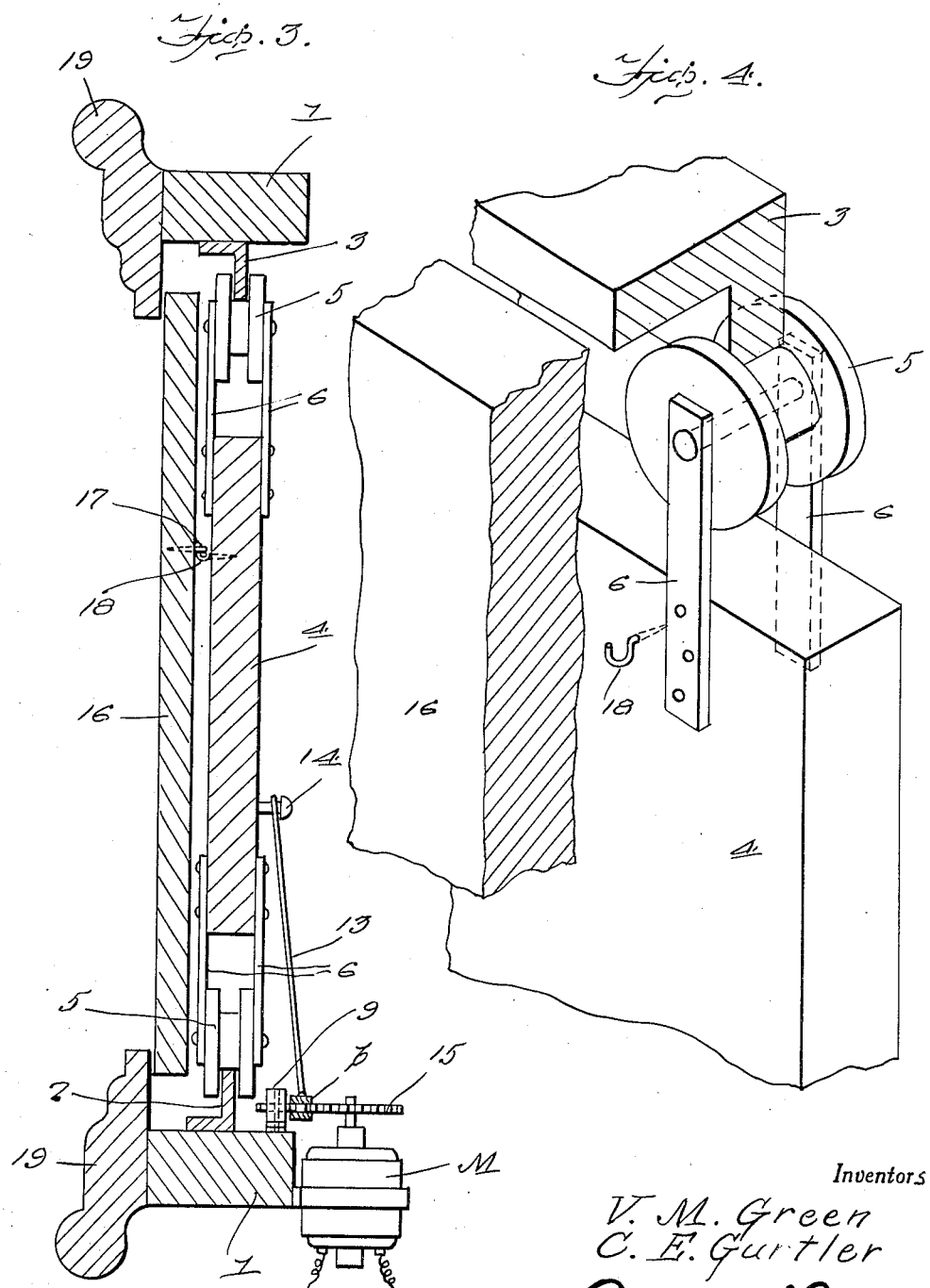

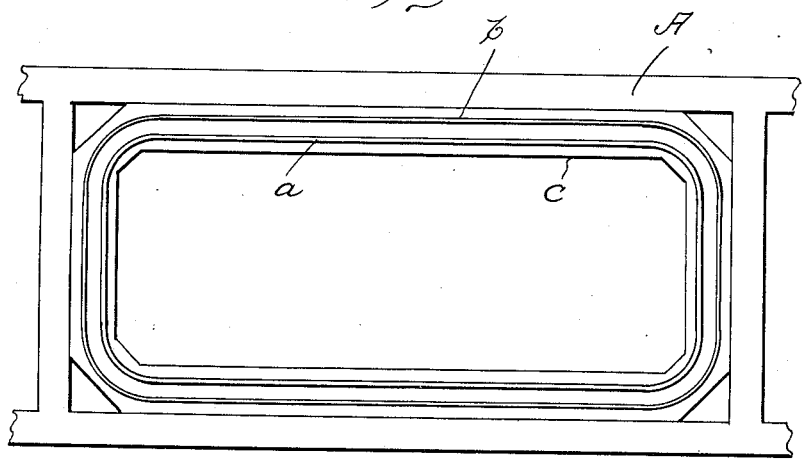
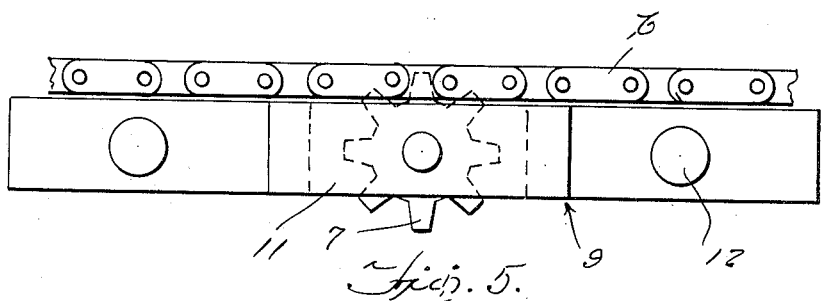
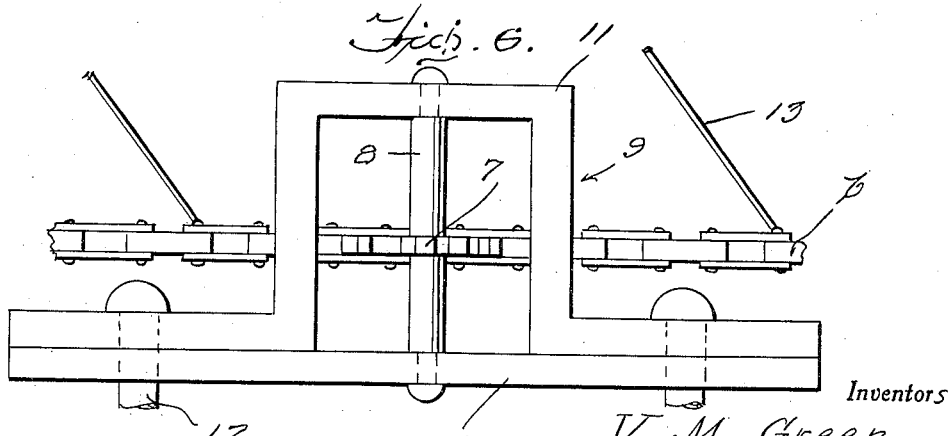

Patented Sept. 27, 1938

2,131,029

UNITED STATES PATENT OFFICE 2,131,029

MOTIONAL ADVERTISING DISPLAY DEVICE

Virginius M. Green and Charles E. Gurtler, Richmond, Va.

Application June 7, 1938, Serial No. 212,358

3 Claims. (Cl. 40—97)

This invention relates to a motional advertising device, the general object of the invention being to provide upper and lower tracks, a plurality of supporting members having wheels at their upper and lower ends engaging the tracks, means for moving the supporting members along the tracks, and means for removably attaching merchandise or advertising supporting panels to the supporting members.

The primary object of the invention is to display various pieces of merchandise or advertising matter, on a motional display unit, which revolves around the inside walls of a store, the edge of an island fixture within a store or around the interior of a bus or street car, etc.

Another object of the invention is to display merchandise, or advertising matter, in such a way that, it shall attract the attention of the readers and prospective customers, as it moves along the walls of a store, or the interior of a bus or street car. Merchandise or advertising that is ordinarily located in inconspicuous places in a store, or towards the rear of a bus or street car, may be easily displayed to all parts of the store, bus or street car, by means of the invention.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a fragmentary perspective view with parts in section showing the invention arranged above the shelves at a store.

Figure 2 is a fragmentary elevation of the invention.

Figure 3 is a vertical sectional view through Figure 2.

Figure 4 is a perspective view with parts in section of parts of the invention.

Figure 5 is a plan view of a sprocket supporting bracket and showing part of the chain.

Figure 6 is an elevation of Figure 5.

Figure 7 is a diagrammatic top plan view showing how the invention is arranged in an enclosure which may be a street car, bus, store or part of a store.

Referring to Figure 7 of the drawings the letter A indicates the walls of an enclosure which may be a street car, bus, store or a part of the store and this view shows an endless track $a$ and an endless chain $b$ supported on a frame $c$ which extends around the interior faces of the wall. Figure 1 shows the invention in use in a store in which the frame parts are shown at 1 as arranged above the shelving B of the store, the frame parts 1 being arranged one above the other and spaced apart, and the lower part bears an angle iron track 2 while a similar track 3 is attached to the under face of the upper frame part 1. A plurality of plate-like supporting members 4 are each provided with the upper and lower grooved rollers 5, see Figures 3 and 4, but each roller is journaled in the elongated plates or strips 6 which are fastened to the member 4. As shown there are a pair of rollers at each end of the member 4. These rollers engage the vertical flanges of the tracks 2 and 3. The endless chain $b$ is supported by the lower frame part 1 in the rear of the track 2 and the supporting means includes a plurality of sprockets 7 over which the chain passes, each sprocket being attached to a shaft 8 journaled in a bracket 9 which includes an elongated member 10 and a channel part 11 having its ends fastened to the member 10 as shown at 12. These brackets are attached to the lower frame part 1 as shown more particularly in Figure 1. A rearwardly and upwardly extending cable 13 is connected to the forward edge of each member 4 as shown at 14 and the lower end of each cable is suitably connected to a link of the chain so that the movement of the chain will draw the members 4 along the tracks. The chain is driven by a motor M suitably supported from the lower frame part 1 and has a gear 15 on its shaft which meshes with the chain. A plurality of panels or plaques 16 are provided for carrying the advertising matter or the merchandise and each panel is provided with the hooks 17 on its rear face for engaging the hooks 18 on the front face of a member 4 so that the panels are removably connected with the members 4 thus permitting the advertising matter or the merchandise to be changed as desired.

In order to give the invention an attractive appearance molding 19 may be attached to the front edges of the frame parts 1 so as to hide from view the tracks and the ends of the panels as each panel is made large enough to entirely hide from view the member 4 to which it is connected and the rollers and their supporting means.

From the foregoing it will be seen that when the motor is in operation the chain will be driven and the cables 13 will pull the members 4 along the tracks with the chain and of course the panels will move with the members 4 so that the merchandise or advertising matter on the front faces of the panels can be seen. As the panels travel along attention will be attracted to the matter carried by them.

The tracks may have rubber portions connected to the outer portions so as to eliminate noise of the rollers engaging the tracks and the sprockets are constructed of fibre-like materials in order to minimize noise. Of course, the tracks are rounded at the corners, as shown in Figure 7. By having the panels or plaques removably connected with the members 4 such panels can be decorated or other merchandise put thereon before they are attached to the members 4.

It is obvious that a motional display of merchandise constantly passing in review, will attract the attention of on-lookers, and prospective customers, bringing to their attention some article of merchandise that they would not otherwise see.

The invention intends to bring the merchandise that is now displayed in less frequently vested places in stores, to the front so that it can be seen by customers, who come in for one item, get it, and leave, without taking notice of stationary displays. To sell merchandise of any nature, whether it be drugs, toiletries, cosmetics, furnishings or otherwise, it must be shown. A sure way of showing and selling merchandise is through moving displays, such as can be arranged and shown by means of the motional display device.

The construction of the motional display device is principally the same for buses and street cars, as for department stores and the like. However, of course, there are no merchandise fixtures or ledges on which the base of the unit is to be placed in such case. It is fastened on the interior of a bus or street car, near the ceiling, in exactly the same position as the stationary advertisements are now located.

There will be no actual merchandise displayed on the plaques used in the last-mentioned case. In the place of such merchandise will be pictures and printed advertising matter of any description desired.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:—

1. In a device of the class described, an endless track including upper and lower rails, an endless flexible member, means for supporting the flexible member adjacent one of the rails and at one side thereof, means for imparting motion to the flexible member, a plurality of plate-like supporting members, rollers at the upper and lower ends of each supporting member engaging the rails, a cable connecting each supporting member to the flexible member and panels detachably connected with the supporting members and adapted to support advertising matter or merchandise on their front faces.

2. In a device of the class described upper and lower frame parts, a rail carried by the upper face of the lower frame part, a rail carried by the underface of the upper frame part, supporting members, rollers at the ends of the supporting members engaging the rails, a chain, means for supporting the same on the upper face of the lower frame part, means for imparting movement to the chain, flexible members connecting the chain with the supporting members and panels detachably connected with the supporting members and having their front faces adapted to support advertising matter or merchandise.

3. In a device of the class described upper and lower frame parts, a rail carried by the upper face of the lower frame part, a rail carried by the underface of the upper frame part, supporting members, rollers at the ends of the supporting members engaging the rails, a chain, means for supporting the same on the upper face of the lower frame part, means for imparting movement to the chain, flexible members connecting the chain with the supporting members and panels detachably connected with the supporting members and having their front faces adapted to support advertising matter or merchandise, a supporting means for the chain including brackets and sprockets rotatably supported by the brackets and engaging the chain.

VIRGINIUS M. GREEN.
CHARLES E. GURTLER.